United States Patent
Kaisers et al.

(10) Patent No.: US 6,206,481 B1
(45) Date of Patent: Mar. 27, 2001

(54) TRAILER CONTROL VALVE FOR A COMPRESSED AIR BRAKE SYSTEM FOR MOTOR VEHICLES

(75) Inventors: Olaf Kaisers, Stuttgart; Eberhard Schaffert, Leonberg, both of (DE)

(73) Assignee: Knorr-Bremse, Munich (DE)

( * ) Notice: Subject to any disclaimer, the term of this patent is extended or adjusted under 35 U.S.C. 154(b) by 0 days.

(21) Appl. No.: 09/142,477

(22) PCT Filed: Dec. 11, 1996

(86) PCT No.: PCT/DE96/02391

§ 371 Date: Sep. 9, 1998

§ 102(e) Date: Sep. 9, 1998

(87) PCT Pub. No.: WO97/32767

PCT Pub. Date: Sep. 12, 1997

(30) Foreign Application Priority Data

Mar. 9, 1996 (DE) .............................. 196 09 222

(51) Int. Cl.[7] ...................................................... B60T 8/50
(52) U.S. Cl. .................. 303/7; 303/3; 303/118.1
(58) Field of Search ........................ 303/3, 7, 15, 118.1

(56) References Cited

U.S. PATENT DOCUMENTS

| | | | |
|---|---|---|---|
| 4,616,881 | * | 10/1986 | Muller et al. ............................ 303/7 |
| 4,919,492 | * | 4/1990 | Samuelson et al. ...................... 303/3 |
| 5,443,306 | * | 8/1995 | Broome ..................................... 303/3 |

FOREIGN PATENT DOCUMENTS

| | | | | |
|---|---|---|---|---|
| 3921 078 A1 | * | 1/1991 | (DE) | .................. 303/118.1 |
| 4226697 C1 | * | 9/1993 | (DE) | .................. 303/118.1 |
| 0110119 A1 | * | 6/1984 | (EP) | .................. 303/118.1 |
| 0547407 A1 | * | 6/1993 | (EP) | .................. 303/118.1 |
| WO 91/08934 | * | 6/1991 | (GB) | .................. 303/118.1 |
| 40 5330415 | * | 12/1993 | (JP) | .................. 303/118.1 |

* cited by examiner

*Primary Examiner*—Matthew C. Graham
(74) *Attorney, Agent, or Firm*—Ronald E. Greigg; Edwin E. Greigg

(57) ABSTRACT

A trailer control valve having control pistons for actuating a double seat valve, which can control the communication between a compressed air reservoir, a compressed air consumer, and a pressure relief location. In order to structurally simplify the trailer control valve, a control piston is provided that is jointly associated with an electrical control circuit and a pneumatic control circuit of a service brake system. Furthermore, a valve is provided that is connected to the pneumatic control circuit of the service brake system, which closes the pneumatic control circuit of the service brake off from to the trailer control valve when the electrical control circuit is functional, and in the event of a failure of the electrical control circuit, unblocks the pneumatic control circuit of the service brake system.

3 Claims, 3 Drawing Sheets

TRAILER CONTROL VALVE FOR A COMPRESSED AIR BRAKE SYSTEM FOR MOTOR VEHICLES

PRIOR ART

Figure 4:
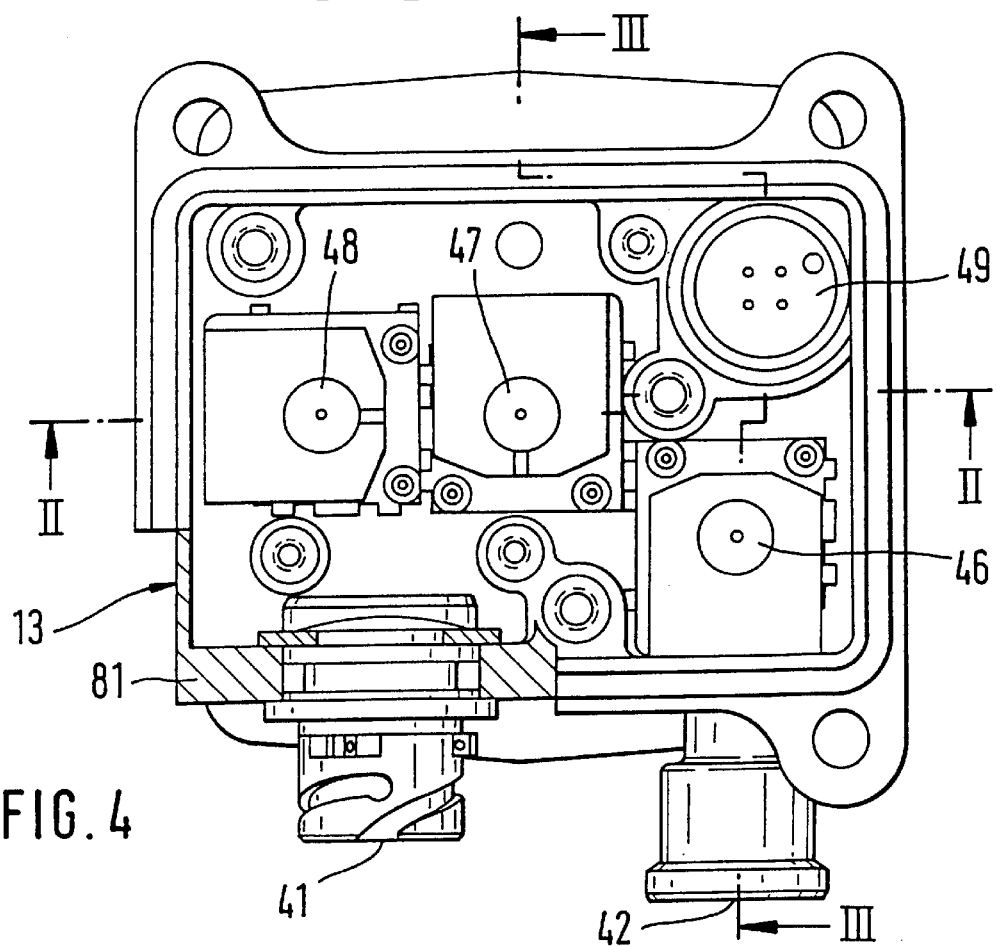

EP 0 110 119 A1, FIG. 4 and EP 0 547 407 A1 have disclosed a relay valve whose control chamber can be controlled with control pressures conveyed from two control circuits of an electronically controlled compressed air brake system for motor vehicles. The relay valve is connected to at least one brake cylinder of the vehicle. The two control pressures can be generated with an actuation of the braking power transmitter, a control pressure in an electrical part of the braking power transmitter and a control pressure in a pneumatic part. Each control pressure can take the place of the other. However, since the control pressure generated in the electrical part of the braking power transmitter should be the leading one, in the presence of this control pressure, the other control pressure generated in the pneumatic part of the braking power transmitter is held back by means of a reversing valve disposed upstream of the control chamber of the relay valve. However, if the control pressure generated in the electrical part of the braking power transmitter fails, then the other control pressure comes into play in the control chamber of the relay valve by means of reversing the valve. The compressed air brake system therefore maintains its functioning capacity when there is a failure of this kind.

Conventional compressed air brake systems of motor vehicles have two control circuits of a service brake system that are separate from each other, of which one control circuit is associated with the front axle of the vehicle and one control circuit is associated with the rear axle. Pulling vehicles of vehicle combinations are furthermore equipped with a trailer control valve for actuating a trailer brake system. The trailer control valve that constitutes a relay valve has two control chambers each of which is respectively connected to a control circuit of the service brake system for the purpose of a parallel redundancy. Another control chamber of the trailer control valve is connected to an auxiliary brake system of the pulling vehicle. The trailer brake system can be actuated by means of introducing pressure into the control chambers of the trailer control valve, which are connected to the control circuits of the service brake system. The control circuit associated with the rear axle of the pulling vehicle is the leading one. In addition, the trailer control valve can be switched over for braking purposes by means of a pressure decrease in the control chamber associated with the auxiliary brake system.

Electronically controlled compressed air brake systems of pulling vehicles are equipped with a trailer control module, according to DE 42 26 697 C1, which has a trailer control valve with two control chambers associated with the control circuits of the service brake system. Since the leading control circuit is an electrically operating one, solenoid valves are provided in the upper part of the valve housing, with which control air withdrawn from a compressed air reservoir can be introduced into the associated control chamber for an actuation of a trailer brake system. In the event of a failure of the electrical control circuit, the second, pneumatic control circuit comes into play for the introduction of control air into the second control chamber of the trailer control valve. Whereas the electrical control circuit thus functions alone and with a high degree of functional reliability in the control of the trailer brake system, a second control chamber is kept in reserve in the trailer control valve and only needs to be used in the unlikely event of a failure. Furthermore, in the known trailer control valve, measures are taken to keep a control piston disposed in the second control chamber mobile so that it is functional in the event of a failure of the electrical control circuit. Viewed on the whole, measures that are relatively costly in terms of construction are taken in order to maintain the function of the trailer control valve, for an unlikely defect of the electrical control circuit.

ADVANTAGES OF THE INVENTION

The trailer control module according to the invention has an advantage over the prior art that the structural costs are reduced considerably by means of eliminating the second control chamber with its control piston. Nevertheless, it is assured, however, that in any case, a control piston is available, independent of which control circuit a control pressure is used from. In addition, the directional control valves of an extremely simple design that are inserted into a corresponding circuit arrangement are sufficient in order to generate a control pressure in the electrical control circuit using the compressed air reservoir associated with the auxiliary brake system and to modulate this control pressure, for example as a function of load or brake slip.

Advantageous improvements and updates of the trailer control module are possible by means of the measures taken hereinafter.

In the improvement of the invention disclosed herein, simple means are used to achieve the fact that in the event of a failure of the electrical control circuit, the control pressure of the pneumatic control circuit can come into play on the one control piston.

Finally, the measure disclosed herein produces a component in which the electrical and mechanical means are united that are required for directly controlling the one control piston.

DRAWINGS

An exemplary embodiment of the invention is shown in simplified form in the drawings and will be explained in more detail in the description that follows.

Figure 1:
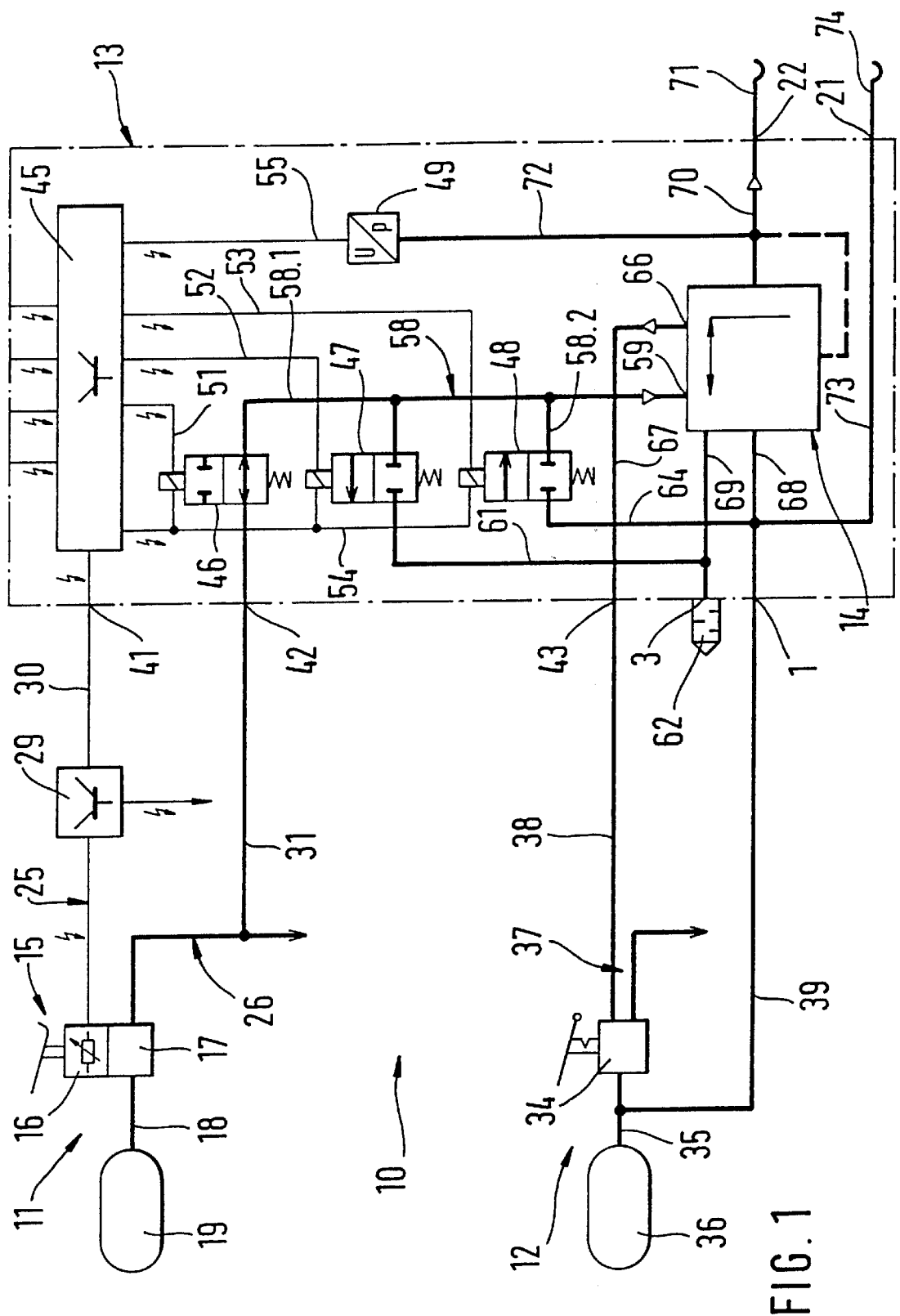
Figure 2:
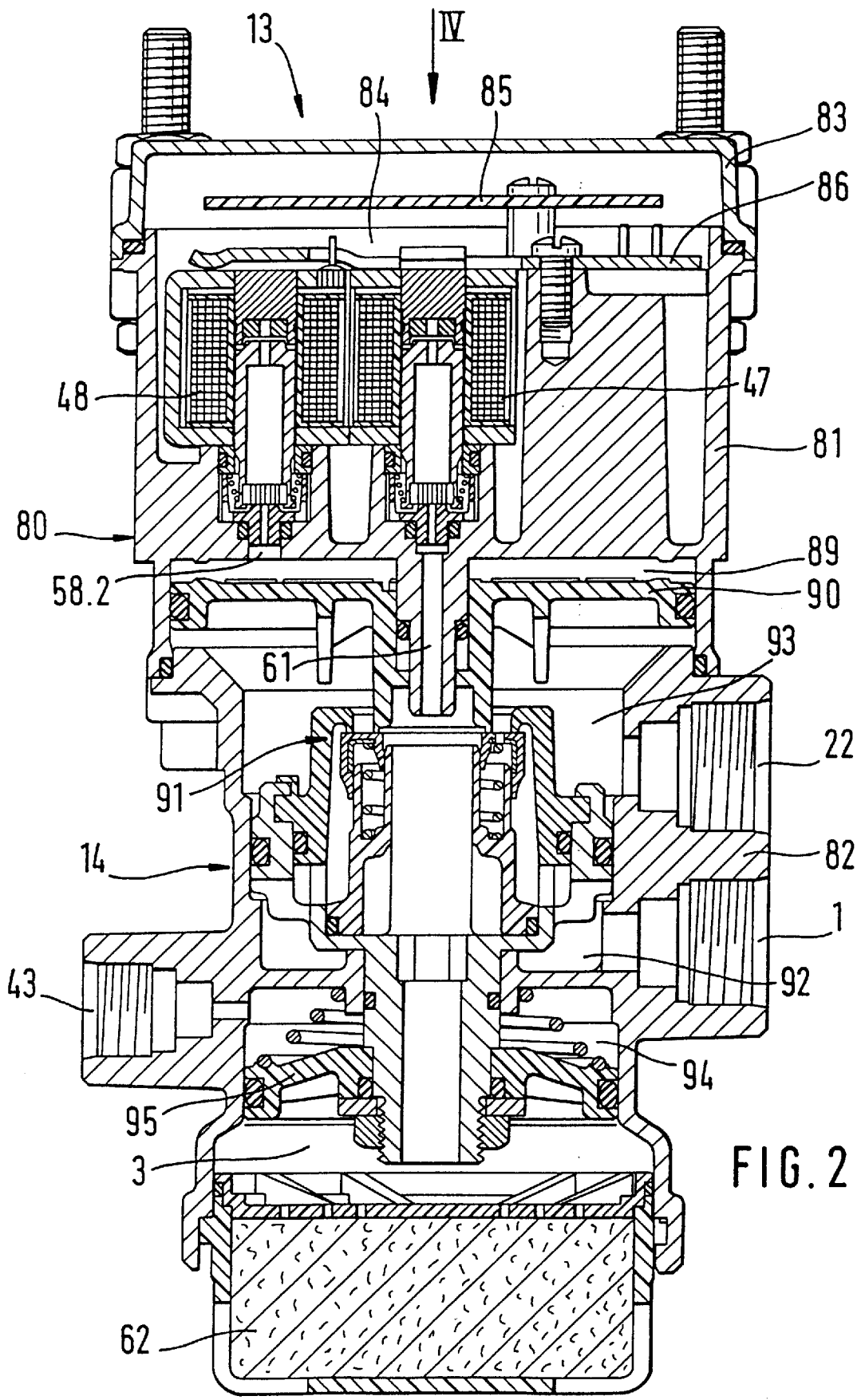
Figure 3:
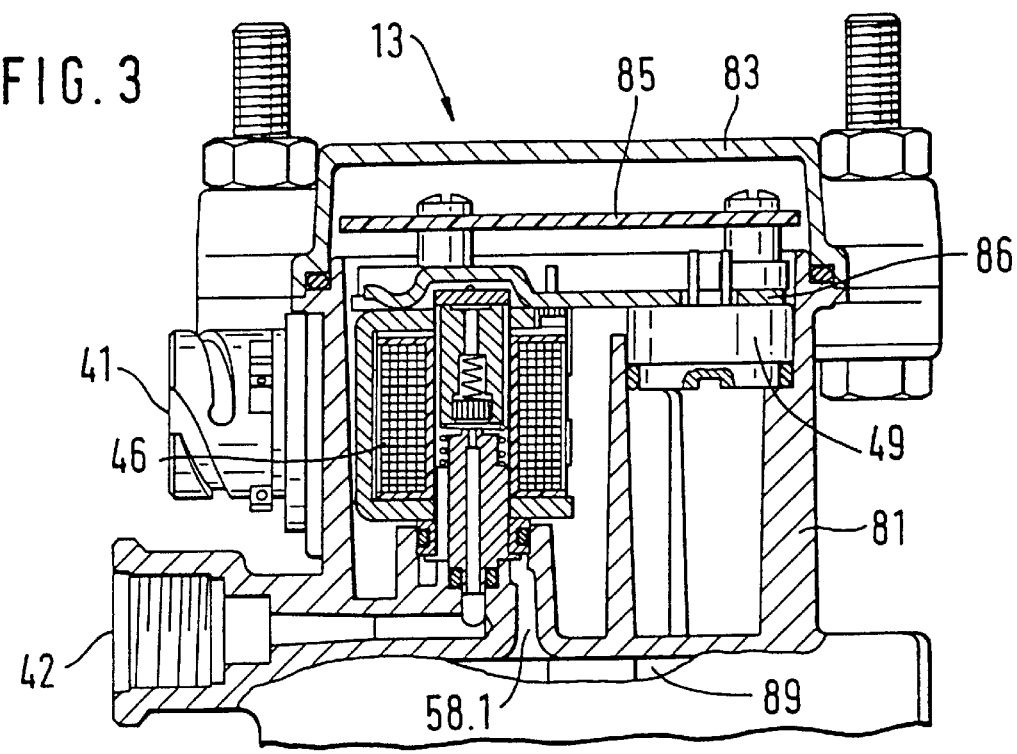

FIG. 1 shows a circuit diagram of a trailer control module with an electrically and pneumatically controllable trailer control valve, FIG. 2 is a section through the component along the line II—II in FIG. 4, FIG. 3 is a section through the upper part of the component along the line III—III in FIG. 4, and FIG. 4 shows a top view of the opened component, viewed in the direction of the arrow IV in FIG. 2.

DESCRIPTION OF THE EXEMPLARY EMBODIMENT

A dual-circuit, dual-line, externally powered compressed air brake system 10, which is only partially schematically depicted in FIG. 1, has a service brake system 11, an auxiliary brake system 12, and a trailer control module 13 (called module below) with a trailer control valve 14. The compressed air brake system 10 is disposed on a pulling vehicle; it is provided for trailer operation.

The service brake system 11 has a foot-actuated braking power transmitter 15 with an electrical part 16 and a pneumatic part 17. The part 17 of the braking power transmitter 15 communicates with a compressed air reservoir 19 by way of a reservoir line 18.

The braking power transmitter 15 is connected with its electrical part 16 to an electrical control circuit 25 and is connected with its pneumatic part 17 to a pneumatic control circuit 26 of the service brake system 11. The electrical control circuit 25 can be used for the control of a brake circuit, not shown, which is associated with the rear axle of the pulling vehicle, while the pneumatic control circuit 16 can be provided for controlling a brake circuit, likewise not shown, which belongs to the front axle of the pulling vehicle.

The electrical control circuit 25 of the service brake system 11 has an electronic control device 29, which is connected by way of an electrical control line 30 to an electrical control connection 41 of the module 13. The pneumatic control circuit 26 of the service brake system 11 has a pneumatic control line 31 which leads to a pneumatic control connection 42 of the module 13. Brake pressure request signals can be transmitted to the control connections 41 and 42 of the module 13 by means of actuating the braking power transmitter 15.

The auxiliary brake system 12 has a hand-actuated auxiliary brake valve 34, which is connected to a compressed air reservoir 36 by a reservoir line 35. The auxiliary brake valve 34 is used to control a pneumatic control circuit 37 which can actuate the auxiliary brakes associated with the rear axle of the pulling vehicle. The pneumatic control circuit 37 furthermore has a pneumatic control line 38 leading from the auxiliary brake valve 34 to a control connection 43 of the module 13. Finally, a branching line 39 of the reservoir line 35 is routed from the compressed air reservoir 36 to a reservoir air connection 1 of the module 13.

As mentioned at the beginning, the module 13 includes a trailer control valve 14. Furthermore, control electronics 45, a retention valve 46, an outlet valve 47, an inlet valve 48, and a pressure sensor 49 are disposed in the module 13. The three valves 46, 47, and 48 are embodied as electromagnetically actuatable 2/2-way valves with spring restoring.

Like the electrical part 16 of the braking power transmitter 15 and the electronic control device 29 of the electrical control circuit 25, the control electronics 45 are connected to an electrical energy supply of the pulling vehicle in a manner that is not shown. The control electronics 45 are connected to the electrical control connection 41 of the module 13. The valves 46, 47, and 48 are respectively connected to the control electronics 45 by way of a signal line 51, 52, and 53 as well as by way of a common line 54. The pressure sensor 49 is connected to the control electronics 45 by way of a line 55. The control electronics 45 have other inputs, not shown in detail, for example for load, brake slip, coupling force, and abrasion-dependent control signals.

The retention valve 46 of the module 13 is connected on the one hand to the pneumatic control connection 42; on the other hand, a pneumatic control line 58 leads from the retention valve 46 to a control input 59 of the trailer control valve 14. The retention valve 46 thus connected to the pneumatic control circuit 26 of the service brake system 11 assumes its open position when it is without current and can be switched into its closed position when actuated by an electromagnet.

On the inflow side, the outlet valve 47 is likewise connected to the pneumatic control line 58. On the outlet side, it is connected by way of a line 61 to a pressure relief location 3 of the module 13. The pressure relief location 3 is provided with a noise damper 62. The outlet valve 47 assumes its closed position actuated by a spring and can be switched into its open position when actuated by an electromagnet.

On the inflow side, the inlet valve 48 is connected by way of a line 64 to the reservoir air connection 1 of the module 13. On the outlet side, it is connected to the pneumatic control line 58. The inlet valve 48 assumes its closed position actuated by a spring and assumes its open position when actuated by an electromagnet.

By means of a pressure increase, the trailer control valve 14 can be switched over for braking purposes by way of its control input 59. The trailer control valve 14 has a second control input 66, which is connected to the control connection 43 of the module 13 by way of a pneumatic control line 6. Consequently, the trailer control valve 14 can likewise be switched over for braking purposes by means of a pressure decrease generated in the pneumatic control circuit 37 of the auxiliary brake system 12. The trailer control valve 14 is connected to the reservoir connection 1 of the module 13 by way of a reservoir line 68. An outlet line 69 for compressed air leads from the trailer control valve 14 to the pressure relief location 3 of the module 13. On the outlet side, a pneumatic control line 70 leads from the trailer control valve 14 to a control connection 22 of the module 13, to which a brake line 71 is connected. The pressure sensor 49 is connected to the control line 70 by way of a line 72. Finally, another line 73 is provided in the module 13, which line is connected to the reservoir air connection 1 and leads to a connection 21 from which a reservoir line 74 leads. The brake line 71 and the reservoir line 74 can be connected to a compressed air brake system of a trailer, not shown, whose trailer control valve, not shown, is referred to below as a consumer of the control pressure air transmitted by way of the brake line 71 during a braking procedure.

The module 13, in cooperation with the service brake system 11 and the auxiliary brake system 12, has the following mode of operation during a braking procedure: Upon actuation of the braking power transmitter 15, the control electronics 45 receive an electrical brake pressure request signal. With the occurrence of this signal, the control electronics 45 switch the retention valve 46 into the closed position so that a pneumatic brake pressure request signal conveyed by way of the pneumatic control circuit 26 cannot come into play at the control input 59 of the trailer control valve 14. The signal of the electrical control circuit 25 takes precedence over the signal of the pneumatic control circuit 26. The control electronics 45 modulate the electrical brake pressure request signal of the electrical control circuit 25 in the following manner: for pressure increase at the control input 59 of the trailer control valve 14, the inlet valve 48 is switched into its open position, while the outlet valve 47 stays in its closed position. For maintaining pressure, the inlet valve 48 is switched over to its closed position. For pressure reduction, the inlet valve 48 stays in its closed position while the outlet valve 47 is switched into the open position. In accordance with the signal course and the signal level at the control input 59, the trailer control valve 14 introduces a control pressure into the brake line 71.

If the leading electrical control circuit 25 is impaired, the valves 46, 47, and 48 assume their shown positions. A pneumatic brake pressure request signal conveyed by the pneumatic part 17 of the braking power transmitter 15 to the control connection 42 is sent by way of the open retention valve 46, through the pneumatic control line 58, to the same control input 59 of the trailer control valve 14 to which the brake pressure request signal, which is modulated by the control electronics 45, is otherwise supplied when the brake system is intact.

A braking of the trailer can also be realized by means of pressure reduction at the control input 66 by virtue of the fact that a pressure decrease is carried out in the pneumatic control circuit 37 of the auxiliary brake system 12 by means of the auxiliary brake valve 34.

The module 13 with the trailer control valve 14 does not thus far differ from the one according to DE 42 26 697 C1 mentioned at the beginning; however, the joint control input 59 of the trailer control valve 14 is essential to the invention for a pneumatic brake pressure request signal generated by the electrical control circuit 25 or the pneumatic control circuit 26 of the service brake system 11.

The structural design of the module 13 is reproduced in FIGS. 2 to 4. The module 13 has a housing 80 comprised of a top part 81 and a bottom part 82 (FIG. 2). In the top part 81 of the housing 80, a printed circuit board 85 of the control electronics 45, the retention valve 46, the outlet valve 47, the inlet valve 48 and the pressure sensor 49 are disposed in a housing chamber 84 under a cover 83. The valves 46 to 48 and the pressure sensor 49 are fastened to the top part 81 by way of a common securing plate 86.

Toward the bottom part 82, the top part 81 of the housing has a control chamber 89 with a control piston 90. This is provided for actuation of a double seat valve 91 disposed in the bottom part 82. This valve is a combined inlet and outlet valve that can control the connection between a storage chamber 92 and a brake chamber 93 or the connection between the brake chamber 93 and the pressure relief location 3 of the module 13. The storage chamber 92 is connected to the reservoir air connection 1, the brake chamber 93 is connected to the brake line connection 22. Furthermore, the module 13 has a control chamber 94 with a control piston 95 and this control chamber communicates with the control connection 43 associated with the auxiliary brake system 12. The trailer control valve 14 disposed in the module 13 differs from the conventional type merely in that it has a control piston 90 with a control chamber 89, and this piston is jointly associated with the electrical control circuit 25 and the pneumatic control circuit 26 of the service brake system 11.

It is clear from FIG. 3 that the retention valve 46 connected to the pneumatic control circuit 26 communicates on the inflow side with the control connection 42 and on the outflow side, communicates with the control chamber 89 by way of a line 58.1. When it is without current, the retention valve 46 assumes its open position. When supplied with current, it interrupts the communication between the control connection 42 and the control chamber 89.

It is clear from FIG. 2 that the inlet valve 48, which is connected to the reservoir air connection 1 in a manner not shown, monitors a line 58.2 into the control chamber 89. As shown, when the inlet valve 48 is without current, it closes off the communication with the control chamber 89.

The outlet valve 47 communicates with the control chamber 89 in a manner not shown and monitors the line 61 leading to the pressure relief location 3 (FIG. 2). When it is without current, it closes off the communication between the control chamber 89 and the pressure relief location 3.

The pressure sensor 49 communicates with the brake chamber 93 in a manner that is not shown in FIGS. 2 to 4. It consequently detects the pressure, which prevails at the brake line connection 22 and is controlled by the trailer control valve 14.

The foregoing relates to a preferred exemplary embodiment of the invention, it being understood that other variants and embodiments thereof are possible within the spirit and scope of the invention, the latter being defined by the appended claims.

What is claimed is:

1. A trailer control module (13) for introducing a control pressure into brake lines of a trailer comprising an electrically and a pneumatically controllable trailer control valve (14), said control valve is controlled by means of an electrical control circuit (25) and a pneumatic control circuit (26) of a service brake system (11) as well as of a pneumatic control circuit (37) of an auxiliary brake system (12), the pneumatic control circuit (26) is fed from a first compressed air reservoir (19) that is a part of the service brake system (11), and is able to control the trailer control valve (14) in place of the electrical control circuit (25), said trailer control module has control pistons for actuating a double seat valve (91) which controls a communication between a second compressed air reservoir (36), a compressed air consumer, and a pressure relief location (3), a control piston (90), which is jointly associated with the electrical control circuit (25) and the pneumatic control circuit (26) of the service brake system (11), is provided in the trailer control valve (14), a valve (46) is provided, which is connected to the pneumatic control circuit (26) of the service brake system (11) and closes off the pneumatic control circuit (26) of the service brake system (11) to the trailer control valve (14) when the electrical control circuit (25) is functional, and in the event of a failure of the electrical control circuit (25), said valve (46) unblocks the pneumatic control circuit (26) of the service brake system, as a part of the control module (13), the electrical control circuit (25) of the service brake system (11) is connected to an inlet valve (48) and an outlet valve (47), said inlet valve (48) and said outlet valve (47) are embodied as electromagnetically actuated 2/2-way valves that are closed when without current, the inlet valve (48) is connected to the second compressed air reservoir (36) of the auxiliary brake system (12) on an inflow side, and on an outflow side is connected to a control chamber (89) associated with the common control piston (90) of the trailer control valve (14), while the outlet valve (47) is connected to the control chamber (89) on an inflow side, and is connected to the pressure relief location (3) on an outflow side.

2. The trailer control module according to claim 1, in which the valve (46) connected to the pneumatic control circuit (26) of the service brake system (11) is an electromagnetically actuated 2/2-way valve, which is switched by the electrical control circuit (25) and assumes an open position when the valve (46) is without current.

3. The trailer control module according to claim 1, in which the valve (46) connected to the pneumatic control circuit (26) of the service brake system (11) and the inlet valve (48) and the outlet valve (47) of the electrical control circuit (25) are disposed in a chamber (84) of a housing (80) containing the trailer control valve (14), said chamber (84) also contains a pressure sensor (49) for detecting the consumer pressure controlled by the trailer control valve (14) as well as control electronics (45) connected to the electromagnetically actuated valve (46) outlet valve (47), inlet valve (48) and the pressure sensor (49), the control electronics control the electromagnetically actuated outlet and inlet valves (47, 48) of the electrical control circuit (25) upon transmission of an electrical brake pressure request signal.

* * * * *

UNITED STATES PATENT AND TRADEMARK OFFICE
CERTIFICATE OF CORRECTION

PATENT NO. : 6,206,481 B1
DATED : March 27, 2001
INVENTOR(S) : Kaisers et al.

It is certified that error appears in the above-identified patent and that said Letters Patent is hereby corrected as shown below:

Title page,
Item [73] Assignee: please change Knorr-Bremse to -- [73] Assignee: Knorr-Bremse Systeme für Nutzfahrzeuge GmbH --

Signed and Sealed this

Sixth Day of November, 2001

Attest:

NICHOLAS P. GODICI
Attesting Officer    Acting Director of the United States Patent and Trademark Office